United States Patent
Myron

(10) Patent No.: US 10,264,019 B2
(45) Date of Patent: *Apr. 16, 2019

(54) LOGGING ENCRYPTED DATA COMMUNICATIONS FOR QOE ANALYSIS

(71) Applicant: T-Mobile USA, Inc., Bellevue, WA (US)

(72) Inventor: Peter P. Myron, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,303

(22) Filed: Oct. 6, 2017

(65) Prior Publication Data
US 2018/0034855 A1  Feb. 1, 2018

Related U.S. Application Data

(63) Continuation of application No. 14/880,048, filed on Oct. 9, 2015, now Pat. No. 9,860,273.

(51) Int. Cl.
*H04L 29/06* (2006.01)
*G06F 8/53* (2018.01)
(Continued)

(52) U.S. Cl.
CPC ........... *H04L 63/168* (2013.01); *G06F 8/41* (2013.01); *G06F 8/53* (2013.01); *G06F 8/65* (2013.01); *G06F 11/30* (2013.01); *H04L 43/04* (2013.01); *H04L 63/1425* (2013.01); *H04L 67/02* (2013.01); *H04L 67/025* (2013.01); *H04L 67/125* (2013.01); *H04L 67/322* (2013.01);
(Continued)

(58) Field of Classification Search
CPC ............... G06F 2221/0775; G06F 2221/2101
See application file for complete search history.

(56) References Cited

U.S. PATENT DOCUMENTS 9,270,449 B1  2/2016  Tribble et al.
9,860,273 B2 * 1/2018  Myron ............... H04L 63/168
(Continued)

OTHER PUBLICATIONS

Office action for U.S. Appl. No. 14/880,048, dated May 5, 2017, Myron, "Logging Encrypted Data Communications for QOE Analysis", 24 pages.
(Continued)

*Primary Examiner* — Thaddeus J Plecha
(74) *Attorney, Agent, or Firm* — Lee & Hayes, P.C.

(57) ABSTRACT

A device such as a smartphone may communicate with a server or other network entity using encrypted communications, making it difficult to examine such communications for purposes of identifying communication issues that may affect user QoE (quality of experience). In certain embodiments, an application may be modified to log communication data before encryption and after decryption. For example, the application program may be decompiled and logging instructions may be inserted before portion that result in data encryption and after portions where received data is decrypted. The modified application program may then be recompiled and executed on a device to produce an unencrypted log of data. In other embodiments, elements of the device operating system may be modified to log data before encryption and after decryption.

19 Claims, 5 Drawing Sheets

(51) Int. Cl.
*G06F 8/65* (2018.01)
*G06F 8/41* (2018.01)
*H04L 12/26* (2006.01)
*H04L 29/08* (2006.01)
*G06F 11/30* (2006.01)
*H04W 12/02* (2009.01)
*H04W 4/50* (2018.01)
*G06F 11/34* (2006.01)

(52) U.S. Cl.
CPC ............... *H04L 69/16* (2013.01); *H04W 4/50* (2018.02); *H04W 12/02* (2013.01); *G06F 11/3409* (2013.01); *G06F 2221/0775* (2013.01); *G06F 2221/2101* (2013.01)

(56) References Cited

U.S. PATENT DOCUMENTS

| | | |
|---|---|---|
| 2003/0084319 A1 | 5/2003 | Tarquini et al. |
| 2006/0141984 A1 | 6/2006 | Taglienti et al. |
| 2008/0209541 A1* | 8/2008 | Dequevy ............. H04L 63/0227 726/14 |
| 2009/0172815 A1* | 7/2009 | Gu ........................ G06F 21/552 726/23 |
| 2015/0249585 A1 | 9/2015 | Shomura et al. |
| 2015/0371047 A1 | 12/2015 | Mendelev et al. |
| 2015/0381644 A1 | 12/2015 | Lee et al. |
| 2016/0210215 A1 | 7/2016 | Shani et al. |
| 2017/0104787 A1 | 4/2017 | Myron |

OTHER PUBLICATIONS

Shah, et al., "Auditing to Keep Online Storage Services Honest", retrieved on Sep. 11, 2017 at <<https://www.usenix.org/legacy/event/hotos07/tech/full_papers/shah/shah_html/hotos11web.html>>, 2007, 10 pages.

* cited by examiner

LOGGING ENCRYPTED DATA COMMUNICATIONS FOR QOE ANALYSIS

CROSS REFERENCE TO RELATED APPLICATIONS

This is a continuation application which claims priority to commonly assigned, co-pending U.S. patent application Ser. No. 14/880,048, filed Oct. 9, 2015. Application Ser. No. 14/880,048 is fully incorporated herein by reference.

BACKGROUND

Applications that are installed and/or running on mobile devices often rely upon the services of websites and associated servers that are accessible using wireless network communications. Because of this reliance, application performance and quality of user experience (QoE) may be affected by the ways in which the websites and servers provide data to the applications.

In many situations, it may be possible to monitor data communications between an application and a server and to analyze the communicated data in order to identify things that may adversely affect application and/or device QoE. In some cases, for example, an analyst may determine that server-provided responses to certain requests are delayed, causing an application to seem "laggy" to a user. In other cases, a server may return faulty data that causes repeated requests or other problems when received by the mobile device. In yet other cases, examination of a data flow may reveal problems with network communications paths between the mobile device and a server.

In certain situations, a mobile device may communicate with a server using encrypted communications. For example, a communication protocol known as HTTPS (hypertext transfer protocol secure) may be used in order to ensure privacy and to authenticate data sources. When using a secure communication protocol such as HTTPS, it is difficult or impossible for an analyst to decipher communications between a mobile device and a server, effectively eliminating an analytical tool that would otherwise be available for improving the performance of an application.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are techniques for evaluating issues relating to user quality of experience (QoE) in systems that use encrypted network communications. In an example system, an application program runs on a mobile device under a mobile device operating system. The mobile device and its operating system provide functionality for communicating with remote servers through a wide-area network such as the Internet. In some cases, this functionality is implemented through a network communications protocol stack having a series of protocol layers. For example, a TCP/IP (transmission control protocol/Internet protocol) stack may include an encryption/decryption layer that encrypts outbound data prior to sending the data to a server and that decrypts inbound data after receiving the data from the server. The application program communicates with the server through the network communications protocol stack so that both outbound and inbound data are encrypted.

In one example embodiment, the application program may be decompiled and modified to log unencrypted outbound data before the outbound data is submitted to and encrypted by the network communications protocol stack of the mobile device operating system. The application program may also be modified to log inbound data after it has been received from the network communications protocol stack and decrypted by the mobile device operating system. For example, in order to analyze QoE of an application program written and compiled using the Java programing language, the application program may be decompiled to create a Java bytecode listing of the application. The bytecode listing may then be analyzed to identify points within the program at which data is sent to or received from the network communications protocol stack, and logging functionality inserted at these points so that unencrypted HTTP (hypertext transfer protocol) data is written to a log file in the file system of the mobile device. The bytecode listing is then recompiled, installed on the mobile device, and executed. The resulting log file can then be accessed and analyzed to identify problems or delays in data flows.

In another example embodiment, the network communication protocol stack itself is modified to log network communication data before encryption and after decryption. For example, the TCP/IP (transmission control protocol/Internet protocol) network communications protocol stack of an open-source operating system such as the Android mobile device operating system may be modified to log outbound data prior to encryption and to log inbound data after decryption. Unencrypted HTTP data, for example, may be written to a log file on the mobile device and later accessed by an analyst to identify problems or delays in HTTP data flows.

Figure 1:
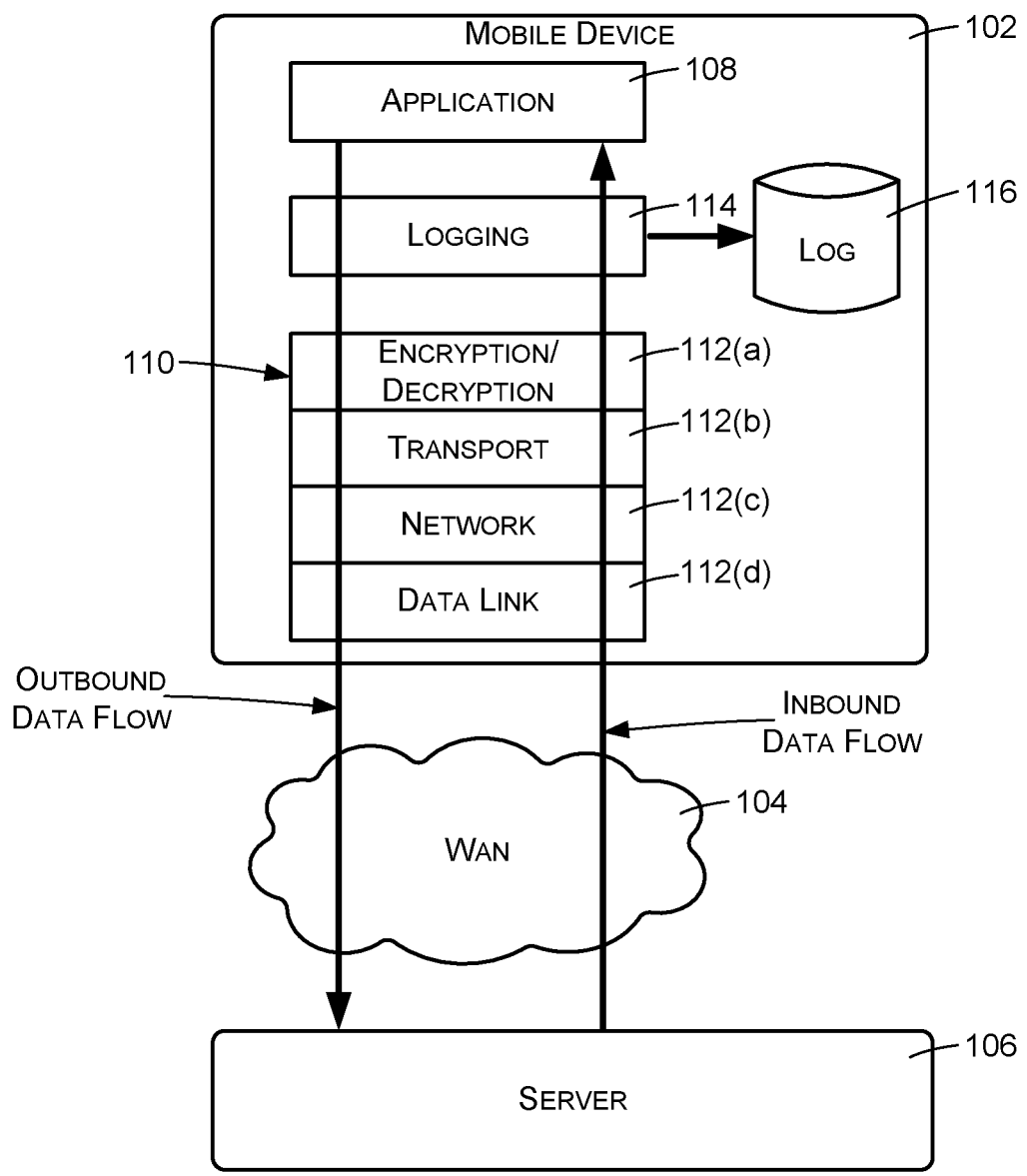
FIG. 1 is a block diagram illustrating communication components in a system using encrypted communications between a mobile device and a network-based server.

FIG. 1 illustrates relevant software component of an example mobile device 102 that is configured to communicate through a wide-area network (WAN) 104 with a server 106. The mobile device 102 may comprise a telecommunications device such as a smartphone, which provides wireless network communications through a cellular telecommunications network with the Internet and with websites and servers that are accessible through the Internet. In the example of FIG. 1, the server 106 may be accessible through a public network such as the Internet or through a private network associated with a telecommunication provider that supports the mobile device 102. For example, the mobile device 102 may communicate with certain servers that are accessible only to mobile devices supported by the telecommunication provider. Servers such as this may provide, for example, billing and other account information relating to usage of the mobile device 102 on the cellular communications network of the communication provider.

In other embodiments, the mobile device 102 may comprise a tablet computer, a laptop computer, a wearable device, a media player, or any other type of device that implements a form of encrypted data communications with remote servers, data sources, or other entities. Furthermore, the described techniques may be implemented in devices other than mobile devices, such as desktop computers, network-enabled appliances, home security systems, home automation systems, other types of communication systems, industrial control systems, automotive computers, and various other types of devices and systems that utilize encrypted data communications.

An application program 108 is installed on and executed by the mobile device 102. The application program 108 may be any type of software that communicates with and accesses data or services of the server 106. In some cases, the application program 108 may be an integrated system component, such as an Internet browser or other component that is a preconfigured part of the mobile device 102 or of the device's operating system. In other cases, the application program 108 may be a third-party or after-market software component that is purchased, downloaded, or otherwise obtained by a user of the mobile device 102 and installed on the mobile device 102 after purchase of the mobile device 102.

The mobile device 102 has a network communication protocol stack 110, which may be part of the operating system of the mobile device 102. The network communications protocol stack 110 has multiple protocol layers 112, each of which may be a software component configured to implement a corresponding protocol. Outbound data sent by the application program 108 to the server 106 is processed in turn by each of the protocol layers 112, from top to bottom. Inbound data received from the server 106 is similarly processed by the protocol layers from bottom to top of the illustrated stack 110.

In use, the application program 108 provides HTTP-formatted paths and query strings to the network communications protocol stack 110. The paths and query strings are encrypted by the network communications protocol stack 110 prior to transmission to the server 106. The application program 108 also receives HTTP-formatted responses and other data from the server 106. The network communications protocol stack 110 decrypts such responses and data before providing them to the application program 108.

At the top level of the network communications protocol stack 110, closest to the application program 108, is an encryption/decryption layer 112(a). In an HTTPS environment, this may comprise a TLS (transport layer security) component or an SSL (secure sockets layer) component that encrypts outbound data and decrypts inbound data using public key cryptography. When using an encryption/decryption layer such as this, all HTTP headers, URLs (uniform resource locators) and message bodies are encrypted for transmission between the mobile device 102 and the server 106.

At the next lower level of the network communications protocol stack 110 is a transport layer 112(b). In many embodiments the transport layer 112(b) may comprise a TCP (transmission control protocol) protocol layer.

Beneath the transport layer 112(b) is a network protocol layer 112(c), which may comprise an IP (Internet protocol) protocol layer.

Beneath the network protocol layer 112(c), closest to the server 106, is a data link layer 112(d), which may implement an Ethernet protocol or other LAN (local-area network) protocol.

Note that the network communications protocol stack 110 shown in FIG. 1 is simplified, and may include other layers that are not shown.

A logging layer or component 114 may be logically positioned between the application program 108 and the encryption/decryption layer 112(a) of the network communications protocol stack 110, so that both outbound and inbound data are processed by the logging component 114. The logging component 114 logs all outbound and inbound HTTP data to a log file or other data structure 116 on the mobile device 102. Because the logging component 114 is between the application program 108 and the encryption/decryption layer 112(a), the HTTP data at this point is not encrypted. Accordingly, the log file 116 contains unencrypted HTTP data, including HTTP strings submitted by the application program 108 and HTTP strings received from the server 106. The logged HTTP data may include all requests and responses, including headers, URLs, message bodies, and so forth, and may also include metadata such as the time at which each of these items was transmitted or received.

In practice, the logging component 114 may be implemented in various ways. In one embodiment, for example, the logging component 114 may be implemented within the application program 108. In another embodiment, the logging component may be implemented by the network communications protocol stack 110 as an additional protocol layer. In yet another embodiment, the logging component 114 may be implemented by the encryption/decryption protocol layer 112(a) of the network communications protocol stack 110, in a way such that the encryption/decryption protocol layer 112(a) logs unencrypted HTTP data, before encryption and after decryption.

Figure 2:
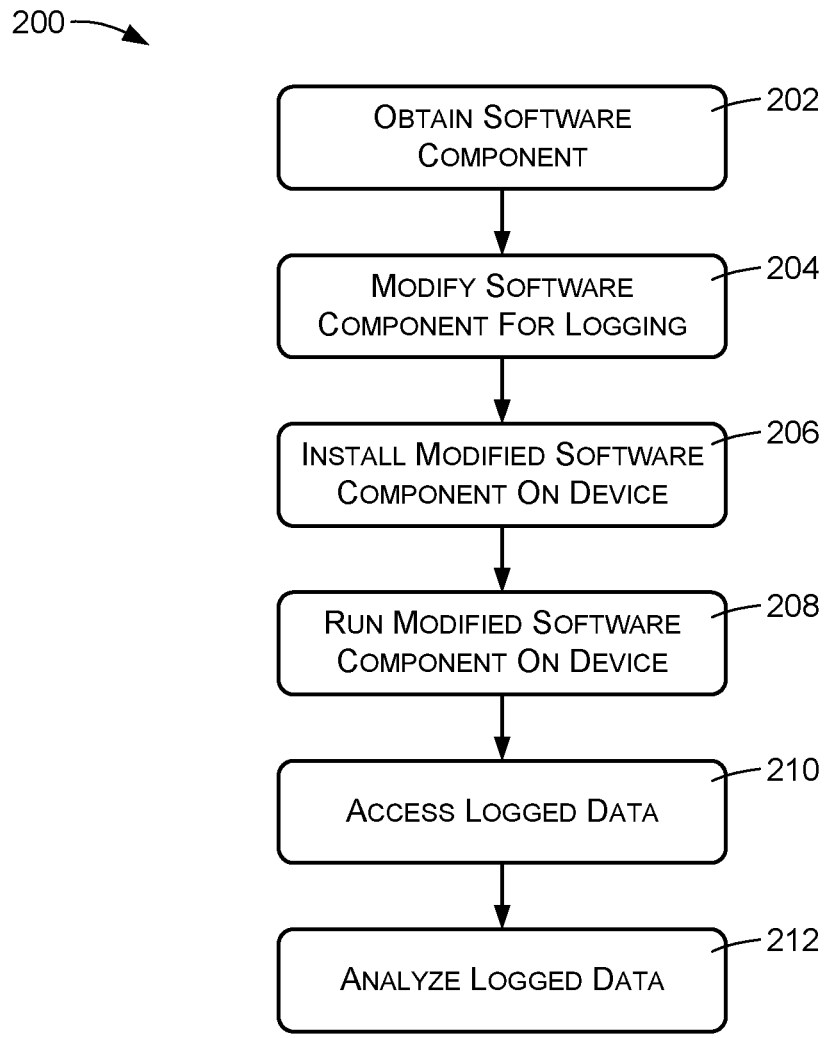
FIG. 2 is a flow diagram illustrating an example method of evaluating quality of experience (QoE) in a system such as shown in FIG. 1.

FIG. 2 illustrates an example method 200 for evaluating quality of experience (QoE) provided by a mobile device 102 or other device that communicates with and utilizes services of a server using an encrypted communication protocol. The method 200 may be performed, as an example, in order to evaluate the QoE provided by an application program 108 that is configured to run on the mobile device 102.

An action 202 comprises obtaining a software component that is configured to run on the mobile device 102, wherein the software component is configured to communicate with the server using an encrypted communication protocol such as TLS or SSL. As one example, the software component may comprise an application program 108 that is designed and configured to run on the mobile device 102 or other type of device and to communicate with a server using encrypted communications. The application program 108 may itself perform encryption or may use the services of a device operating system to perform encryption. As another example, the software component may comprise a device operating system or a communication component of a device operating system, such as a network communication protocol stack 110 of a device operating system. In some implementations, the software component may comprise a TCP/IP network communication protocol stack.

An action 204 comprises modifying the software component to log outbound data before encryption of the outbound data and to log inbound data after decryption of the inbound data. The action 204 may comprise analyzing the software component to locate portions of the software component that cause encryption or that initiate sending of encrypted data. The action 204 may also comprise analyzing the software component to locate portions of the software component that cause decryption of inbound data or that receive the decrypted data resulting from decryption. The modifying 204 may comprise inserting instructions at the located portions of the software component to write unencrypted data to a log file or other data store that is in the file system of the mobile device 102.

An action 206 comprises installing the modified software component on the mobile device 102. For example, the action 206 may comprise installing a modified application program on the mobile device 102. As another example, the action 206 may comprise installing a modified operating system or network communication protocol stack on the device 102. In some situations, installation and/or execution of the modified software component may require elevated user privileges, which may be obtained by "rooting" the device to gain administrative privileges.

An action 208 comprises running the modified software component on the mobile device 102. For example, the action 208 may comprise running the modified application program on the mobile device 102, whereupon the modified application program will write unencrypted inbound and outbound data to a log file on the device. As another example, the action 208 may comprise running the modified operating system or network communication protocol stack, whereupon the modified protocol stack will write unencrypted inbound and outbound data to a log file on the device.

An action 210 comprises accessing the logged data. For example, the mobile device 102 may be connected to a computer and the logged data may be transferred to the computer for analysis. As another example, the mobile device 102 may be configured to send the logged data to a server or other computer for analysis.

An action 212 comprises analyzing the inbound and outbound logged data to evaluate QoE provided by the mobile device 102 and/or an application running on the mobile device 102. The action 212 may in some cases be performed by a human analyst, by examining one or more log files created by the modified software component. In some cases, the logged data may comprise HTTP queries and responses, and the action 212 may comprise analyzing the HTTP queries and responses to identify sequences that may negatively affect user QoE, such as delayed queries or responses, incorrect queries or responses, etc.

Figure 3:
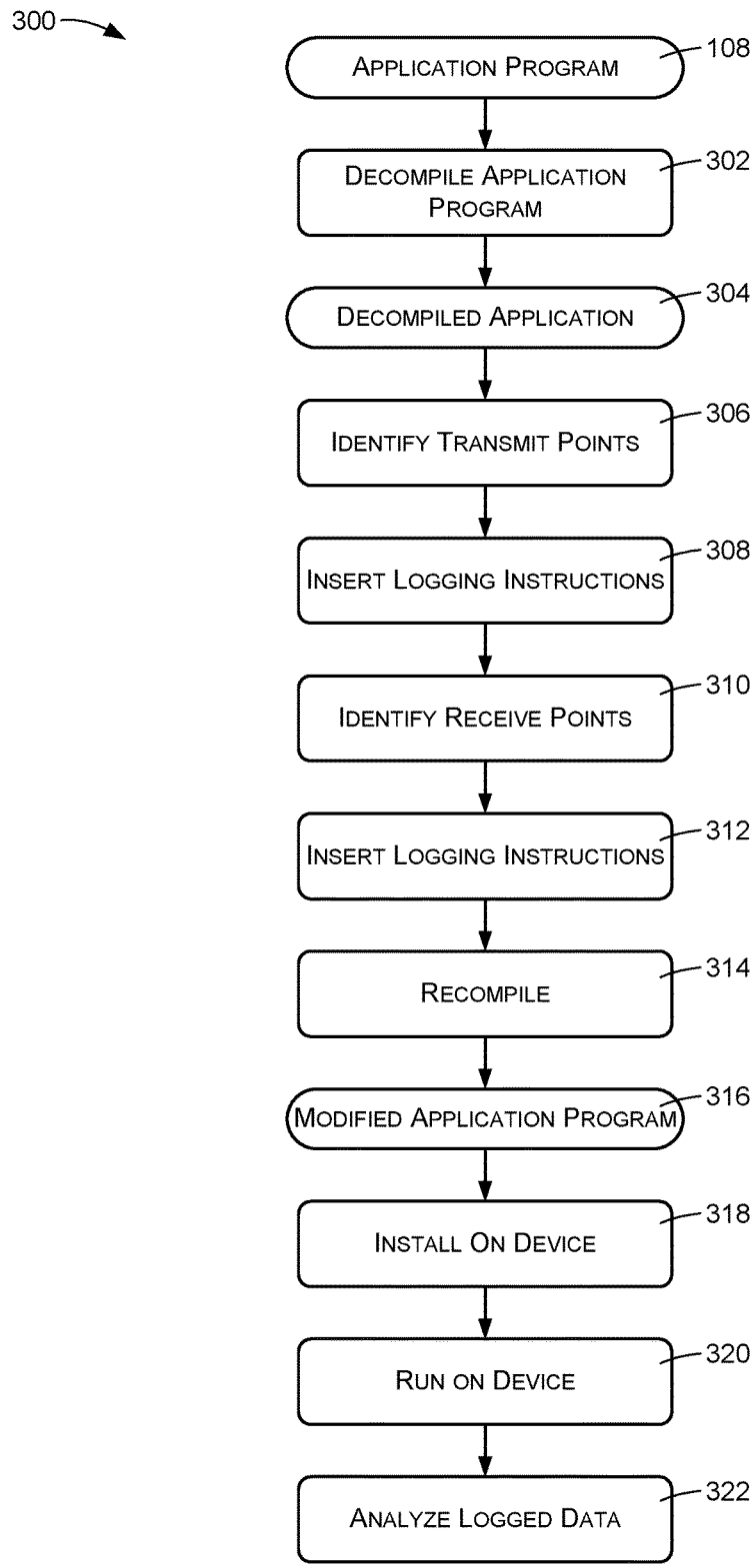
FIG. 3 is a flow diagram illustrating another example method of evaluating QoE in a system such as shown in FIG. 1.

FIG. 3 illustrates a more specific example method 300 for evaluating QoE provided by a mobile device 102 that communicates with a server 106 using an encrypted communication protocol. The method 300 may be performed, as an example, in order to evaluate the QoE provided by an application program 108 that is configured to run on the mobile device 102 and to exchange encrypted data with the server 106.

An action 302 comprises decompiling the application program 108 to produce a decompiled application 304. In certain situations, the application program 108 may comprise an application written and compiled using the Java programming language and a Java compiler. The action 302 may comprise using a Java decompiler to produce the decompiled application 304 based on the binary class files of the application program 108, where the decompiled application 304 may comprise a byte code or source code listing of the Java application program 108.

An action 306 comprises inspecting the source code of the decompiled application 304 to identify any portions or points within the application that cause transmission and/or encryption of outbound data. In many cases, the action 306 may comprise locating instructions or functions within the decompiled application 304 that receive outbound data prior to encryption of the outbound data and/or that initiate sending of outbound data to the server 106. For example, such instructions may be ones that call an API of the mobile device operating system, providing HTTP-formatted data that is to be encrypted and sent to the server using the network communications protocol stack 110.

An action 308 comprises modifying the identified portions of the application and thereby configuring the application program to log outbound data prior to encryption of the outbound data. This may comprise inserting one or more instructions into the decompiled application 304 for execution prior to the identified portions or points of the application that cause transmission and/or encryption of the outbound data. The inserted instructions, when executed, cause the mobile device 102 to write the unencrypted outbound data to the log file 116 prior to encryption of the outbound data. In the example described herein, the inserted instructions may comprise Java instructions that call functions or APIs provided by the device operating system to write to the file system of the mobile device 102. The logged data may include outgoing HTTP strings as well as metadata associated with the strings such as timestamps.

An action 310 comprises inspecting the source code of the decompiled application 304 to identify any portions of or points within the application that receive inbound data after decryption of the inbound data. For example, such an instruction may comprise one that calls or is called by an API of the mobile device operating system to receive inbound data that has been received from the server 106 using the network communications protocol stack 110.

An action 312 comprises modifying the identified portion of the application, and configuring the application program to log the inbound data after the decryption of the inbound data. This may comprise inserting one or more instructions into the decompiled application 304 for execution after the portions of the application identified in the action 310. The inserted instructions, when executed, cause the application program 108 and mobile device 102 to write the decrypted inbound data to the log file 116 after decryption of the received inbound data. In the example described herein, the inserted instructions may comprise Java instructions that call functions or APIs provided by the device operating system to write to the file system of the mobile device 102. The logged data may include incoming HTTP strings as well as metadata associated with the strings such as timestamps.

The actions 306, 308, 310, and 312 may be performed by a human analyst or programmer, or may be performed in an automated fashion such as by a software utility.

An action 314 comprises compiling or recompiling the modified source code of the application to create a modified application program 316. An action 318 comprises installing the modified application program 316 on the device 102. An action 320 comprises running or executing the modified application program 316, which causes the modified application program 316 to write unencrypted inbound and outbound data to the log file 116.

An action 322, which may be performed by a human analyst or using an automated process, comprises analyzing the logged inbound and outbound data from the log file 116 to evaluate QoE of the application program 108.

Figure 4:
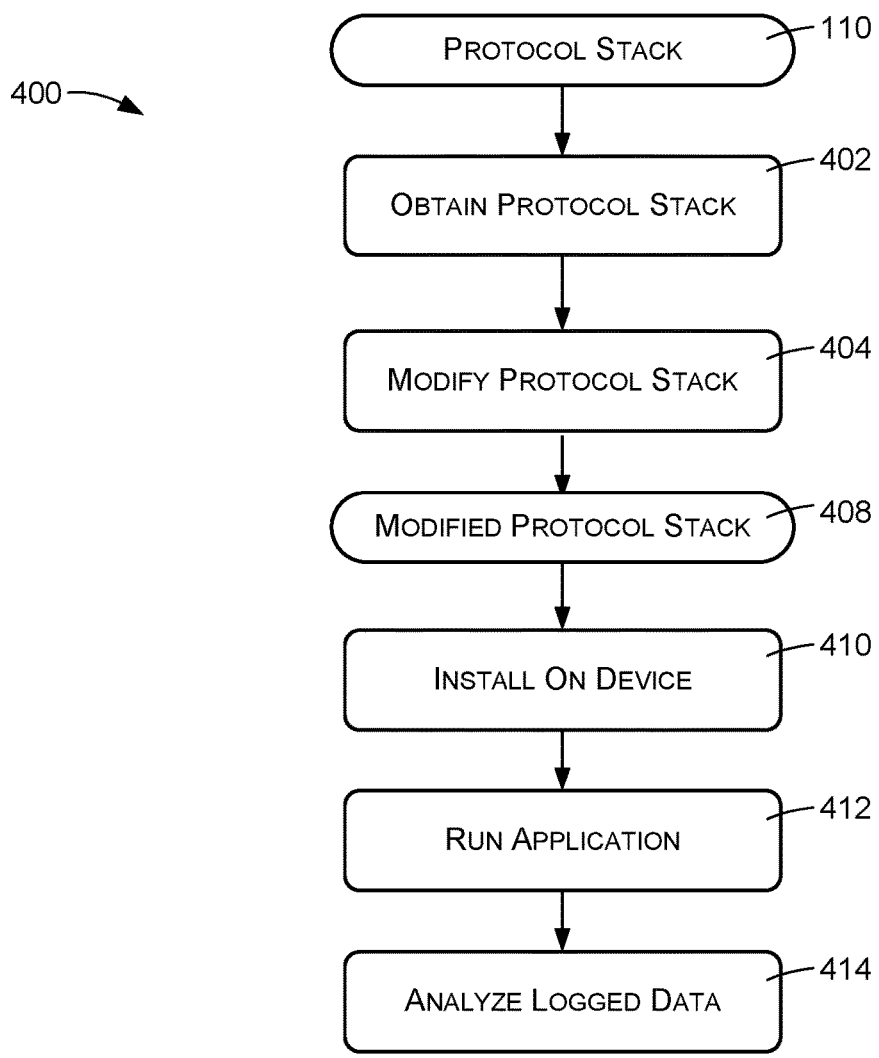
FIG. 4 is a flow diagram illustrating another example method of evaluating QoE in a system such as shown in FIG. 1.

FIG. 4 illustrates an example method 400 for evaluating QoE provided by an application program 108 that runs on a mobile device 102 and that communicates with a server 106 using an encrypted communication protocol. An action 402 comprises obtaining a network communication protocol stack 110, which may be part of a device operating system. For example, the network communication protocol stack 110 may comprise a TCP/IP stack configured to communicate HTTP and/or HTTPS communications between the mobile device 102 and the application program 108. The network communication protocol stack 110 may have an encryption/decryption layer that performs TLS or SSL encryption and decryption.

An action 404 comprises modifying the network communication protocol stack 110 to create a modified network communication protocol stack 408. The modifying 404 may comprise configuring the network communication protocol stack 408 to log outbound data before encrypting the outbound data and to log inbound data after decrypting the inbound data. The inbound and outbound data may be logged to a file on the mobile device, and/or may be communicated to a server or other computer for analysis.

An action 410 comprises installing the modified network communication protocol stack 408 on the mobile device. An action 412 comprises running an application program 108 on the mobile device, wherein the application program 108 utilizes the modified network communication protocol stack 408 to send and receive information. During execution of the application program 108, the modified network communication protocol stack 408 logs unencrypted inbound and outbound data to the log file.

An action 414, which may be performed by a human analyst or using an automated process, comprises analyzing the logged data from the log file to evaluate QoE of the application program 108.

Figure 5:
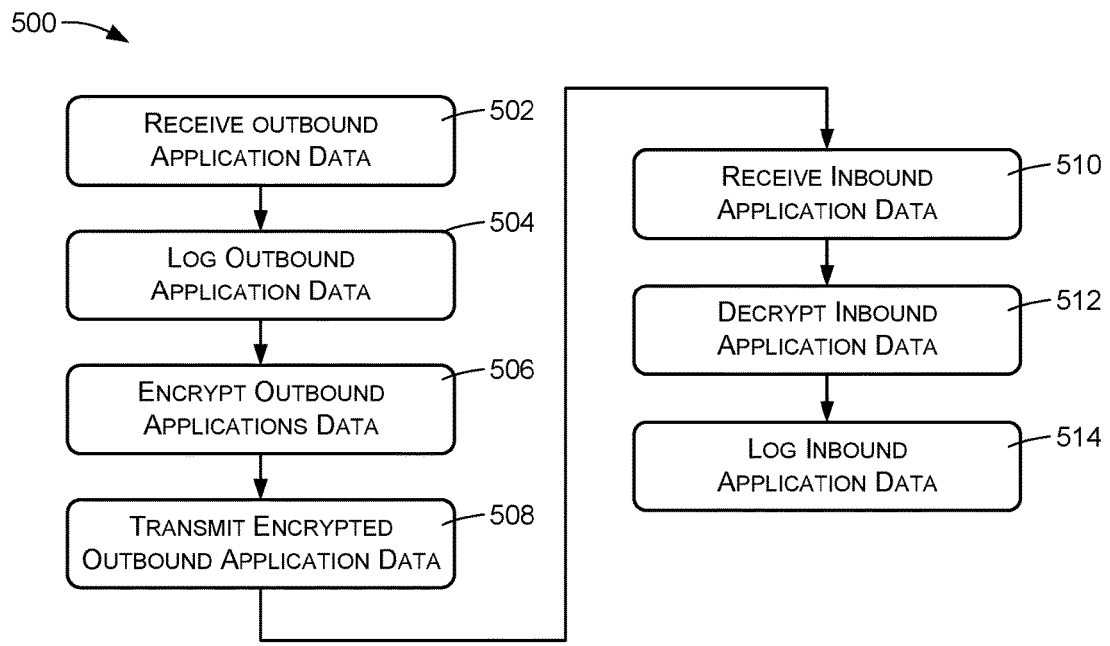
FIG. 5 is a flow diagram illustrating a method that may be implemented by the mobile device of FIG. 1 for logging and analyzing data communications.

FIG. 5 illustrates an example method 500 that may be performed by the modified software component, such as a modified application or a modified network communication protocol stack, either of which may be configured to run on a mobile device or other device that communicates with and utilizes services of a network-based server.

An action 502 comprises receiving outbound application data. For example, a component within an application program may receive unencrypted outbound application data. As another example, a network communication protocol stack may receive outbound application data from the application program.

An action 504 comprises logging the received outbound application data before encryption of the received outbound application data. The outbound application data may be logged to a non-volatile file on the mobile device, as an example.

An action 506 comprises encrypting the outbound application data. The application data may be encrypted using any of various types of encryption, including public-key encryption. In some cases, the encryption may be performed by an encryption/decryption layer of a TCP/IP protocol stack. In other cases, the application program may be configured to perform encryption.

An action 508 comprises transmitting the encrypted outbound application data to a server. The application data may be transmitted over various types of network media, including either or both of wired and wireless transmission media.

An action 510 comprises receiving encrypted inbound application data from the server. For example, a component within the application program may receive encrypted inbound application data. As another example, the network communication protocol stack may receive inbound application data from the server.

An action 512 comprises decrypting the inbound application data. In some cases, the decryption may be performed by an encryption/decryption layer of an TCP/IP protocol stack. In other cases, the application program may be configured to perform decryption.

An action 514 comprises logging the decrypted inbound application data. The inbound application data may be logged to a non-volatile file on the mobile device, as an example.

Figure 6:
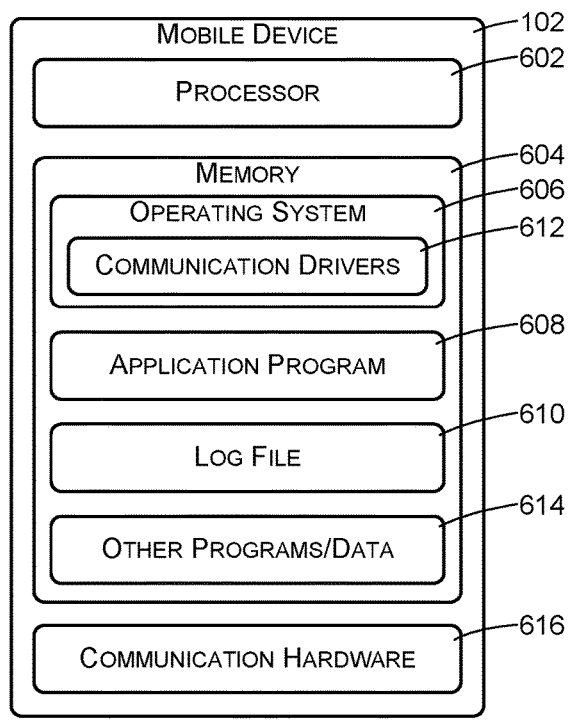
FIG. 6 is a block diagram illustrating relevant high-level components of the mobile device shown in FIG. 1.

FIG. 6 illustrates high-level components and functionality of an example mobile device 102 such as may be used to implement certain of the techniques described above. In particular, the modified software component described above, such as a modified application program or modified protocol stack, may be installed on the mobile device 102 in order to provide an unencrypted log of communications between the mobile device 102 and the server 106.

In this example, the mobile device 102 comprises one or more processors 602 and associated memory 604. In some embodiments, the one or more processors 602 may comprise one or more central processing units (CPUs), microprocessors, processing cores, graphics processing units (GPU)s, and/or other processing units or components known in the art.

The memory 604 may be used to store programs, program modules, data, and so forth. Programs and program modules may be executable by the one or more processors 602 to implement algorithms such as those described above for logging communication data. The data may include files, databases, registries, log files, etc.

In various embodiments, the memory 604 is volatile (such as RAM), non-volatile (such as ROM, flash memory, etc.) or some combination of the two. The memory 604 may include non-removable system memory as well as removable memory such as may be used to store data and to transfer and distribute software. The programs and program modules stored in the memory 604 may comprise methods, threads, processes, applications or any other sort of computer-executable instructions.

More specifically, the memory 604 may include various types of computer-readable storage media, such as electronic memory, magnetic disks, optical disks, tape, etc. Tangible computer-readable media may include volatile and nonvolatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the mobile device 102. Any such tangible computer-readable media may be part of the mobile device 102 or may part of a separate device that is accessible to the mobile device 102.

Most relevant to the discussion herein, the memory 604 contains an operating system 606, an application program 608 and a log file 610. The operating system 606 may be responsible for basic and integral device functionality, and may also provide services for use by the application program 608. For example, the operating system 606 may provide communication drivers 612 that can be accessed by the application program 608 for network communications. In the embodiments described herein, the communication drivers may include a TCP/IP network communication protocol stack as described above. Alternatively, or in addition, the operating system 606 may implement other types of communication drivers 612, which may or may not include encryption/decryption services. In some cases, the communication drivers 612 may comprise the modified network communication protocol stack described above.

The application program 608 may comprise an application that runs under the supervision of the operating system 606. The application program may be installed upon manufacture of the device 102 or may be installed by a user after purchase of the mobile device. In some cases, the application program 608 may comprise the modified application program described above.

The log file 610 may comprise a data file in the file system of the mobile device 102. For example, the operating system 606 may implement such a file system, and the application program 608 may access utilities provided by the operating system 606 to create and write to the log file 610.

The memory 604 may contain other programs, program modules, and/or data 614 that are responsible for both general and specialized operations of the mobile device 102.

The mobile device 102 also has communication hardware 616 that provides physical-layer communications with other computing devices such as the server 106. In some embodiments, the communication hardware 616 may comprise wireless transceivers, radio antennas, modems, wired connection components, etc. In embodiments in which the mobile device 102 comprises a smartphone, the communication hardware may include a radio-frequency (RF) radio configured to communicate using cellular telecommunication networks.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for evaluating quality of experience provided by an application program that runs on a device and that communicates with a server using an encrypted communication protocol, the method comprising:
   receiving a network communication protocol stack from the device;
   modifying the network communication protocol stack of the device, wherein the network communication protocol stack is configured to (a) receive outbound data from the application program, (b) encrypt the outbound data, and (c) transmit the encrypted outbound data to the server;
   wherein the modifying comprises configuring the network communication protocol stack to log the outbound data before encrypting the outbound data;
   installing the modified network communication protocol stack on the device; and
   running the application program on the device, wherein the modified network communication protocol stack logs the outbound data received from the application program.

2. The method of claim 1, wherein the network communication protocol stack comprises a TCP/IP stack.

3. The method of claim 1, wherein the modifying further comprises configuring the network communication protocol stack to log inbound data after decryption of the inbound data.

4. The method of claim 3, further comprising analyzing at least one of the logged outbound data or the logged inbound data to evaluate the quality of experience.

5. The method of claim 3, further comprising logging at least one of the outbound data or the inbound data to one or more log files on the device.

6. The method of claim 3, further comprising logging at least one of the outbound data or the inbound data to the server.

7. The method of claim 3, wherein the outbound data and the inbound data comprise hypertext transfer protocol secure (HTTPS) data.

8. A method for evaluating quality of experience provided by a device, the method comprising:
   obtaining a software component from the device, the software component being configured to communicate using an encrypted communication protocol;
   modifying the software component to log outbound data before encryption of the outbound data and to log inbound data after decryption of the inbound data, wherein the software component encrypts the outbound data subsequent to the outbound data being logged;
   installing the modified software component on the device; and
   accessing the logged inbound and outbound data to evaluate quality of experience provided by the device.

9. The method of claim 8, wherein the software component comprises a network communication protocol stack.

10. The method of claim 8, wherein the software component comprises a TCP/IP network communication protocol stack.

11. The method of claim 8, wherein the software component comprises an application program configured to run on the device.

12. The method of claim 8, further comprising logging at least one of the outbound data or the inbound data to a server.

13. One or more non-transitory computer-readable media storing computer-executable instructions that, when executed by one or more processors, cause the one or more processors to perform acts comprising:
   sending a network communication protocol stack to a server;
   receiving a modified network communication protocol stack from the server, the modified network communication protocol stack being configured to perform operations comprising:
      receiving outbound application data;
      logging the outbound application data before encrypting the outbound application data;
      encrypting the outbound application data;
      transmitting the encrypted outbound application data to the server;
      receiving encrypted inbound application data from the server;
      decrypting the inbound application data; and
      logging the inbound application data after the decrypting.

14. The one or more non-transitory computer-readable media of claim 13, wherein the computer-executable instructions are of an application program configured to run on a device.

15. The one or more non-transitory computer-readable media of claim 13, wherein the computer-executable instructions are of a TCP/IP protocol stack configured to run on a device.

16. The one or more non-transitory computer-readable media of claim 13, wherein the outbound data and the inbound data comprise hypertext transfer protocol secure (HTTPS) data.

17. The one or more non-transitory computer-readable media of claim 13, wherein the acts further comprise analyzing at least one of the logged outbound application data or the logged inbound application data to evaluate a quality of experience.

18. The one or more non-transitory computer-readable media of claim 13, further comprising logging at least one of the outbound application data or the inbound application data to one or more log files.

19. The one or more non-transitory computer-readable media of claim 13, further comprising logging at least one of the outbound application data or the inbound application data to the server.

* * * * *